Nov. 14, 1961　　　E. E. LAKSO　　　3,008,580
SORTING AND INSPECTION TABLE
Filed Feb. 27, 1958　　　2 Sheets-Sheet 1

INVENTOR
EINO E. LAKSO
by Charles R. Fay
ATTORNEY

Nov. 14, 1961  E. E. LAKSO  3,008,580
SORTING AND INSPECTION TABLE
Filed Feb. 27, 1958  2 Sheets-Sheet 2

INVENTOR
EINO E. LAKSO
by Charles R. Fay
ATTORNEY

United States Patent Office 3,008,580
Patented Nov. 14, 1961

3,008,580
SORTING AND INSPECTION TABLE
Eino E. Lakso, Fitchburg, Mass., assignor to The Lakso Company, Inc., Fitchburg, Mass., a corporation of Massachusetts
Filed Feb. 27, 1958, Ser. No. 717,967
1 Claim. (Cl. 209—125)

This invention relates to a new and improved sorting and inspection table. The principal object of the invention resides in the provision of such a table including a pair of traveling belt-like runs for carrying articles to be sorted or inspected, and including means for turning the articles over between the runs, for inspection or sorting also according to the opposite sides thereof; in combination with means providing for travel of the articles along the runs past a single operator station, so that a single operator may inspect or sort all of the articles with adequate vision of both sides of the articles, said runs preferably being uni-directional, co-planar, and traveling at the same speed.

Further objects of the invention include the provision of a device of the class described including a first belt having a substantially horizontal run upon which the articles to be sorted or inspected are gradually deposited, said articles being carried along by said belt past the operator station, to an inversion device, the articles then being carried in the opposite direction out of sight of the operator to a transfer mechanism, and thence from the transfer mechanism to a second belt traveling generally in the direction of the first-named belt, so that by means of the two traveling belt-like devices, each article travels past the same operator station twice at substantially the same location, but on the second passage of the articles past the operator, the articles have been inverted for observation of the opposite side thereof.

A further object of the invention resides in the provision of the inspection and sorting mechanism above described wherein said transfer mechanism comprises a vibrator plate, the vibration of which is arranged to transfer the articles without damage, and without turning them over, to the second run, the articles being transferred easily and without interruption to the forward flow thereof from the first run to the second run of the belt-like means.

Other objects and advantages include the provision of special driving means for the belts and other parts of the machine including an exhaust fan and collection station for abstraction of selected articles from either one of the two belt-like means by the operator, said operator remaining in one position and inspecting or sorting the articles from both belt-like means.

Other objects and advantages of the invention will appear hereinafter.

Reference is to be had to the accompanying drawings, in which

Figure 1:
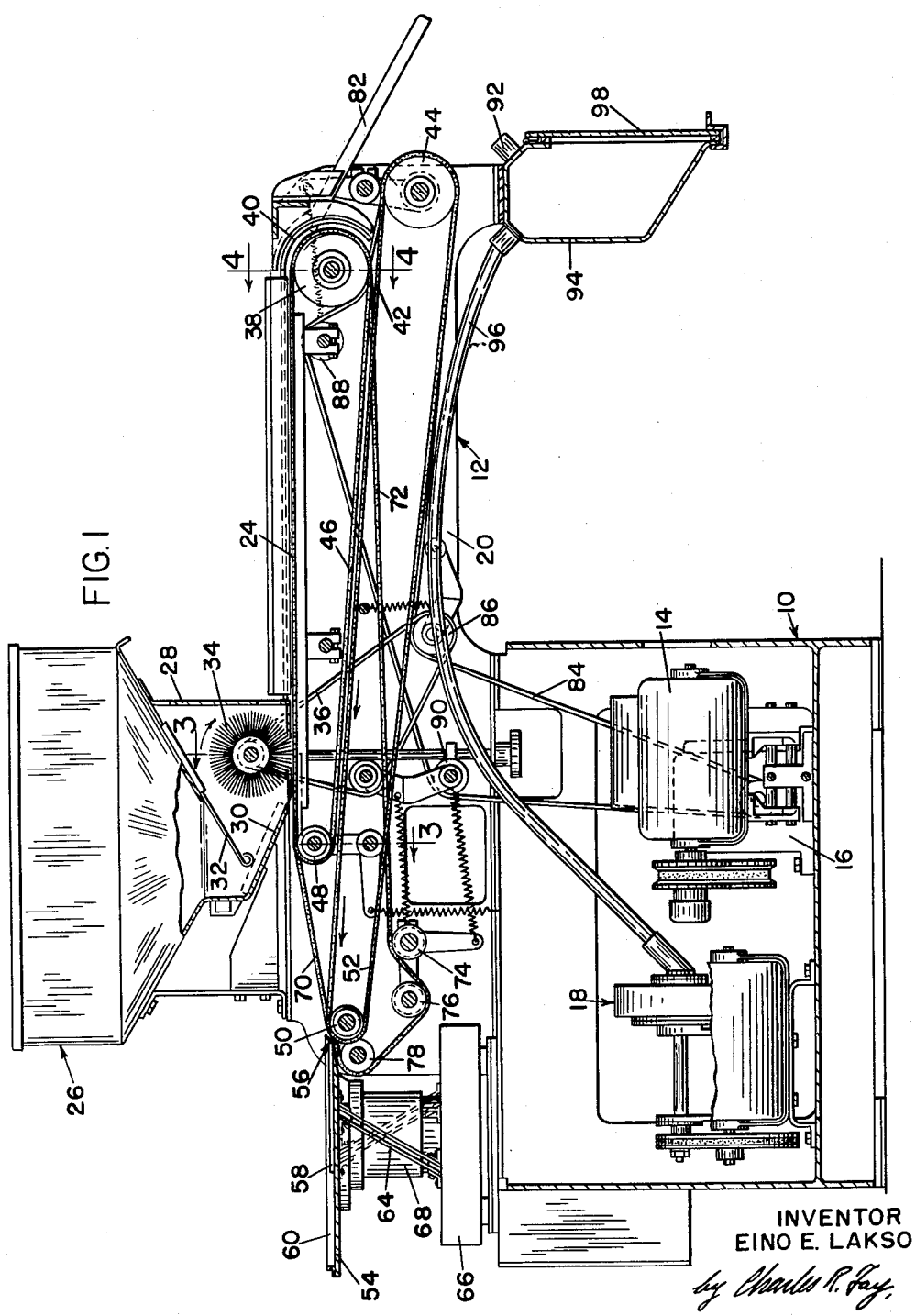
FIG. 1 is a view in side elevation, parts being removed and parts being in section, illustrating the mechanism of the machine.

In carrying out the present invention, the same has been illustrated as applied particularly to a machine for inspecting and sorting tablets, pills and similar articles. There is provided a machine base or framework generally indicated at 10. This framework may be mounted directly on the floor or in any location desired, and it may be placed in permanent position or it may be made movable. This framework provides a support for a top framework generally indicated at 12. Framework 12 carries the inspection apparatus and the framework 10 contains the motor 14 used for driving the various parts, including a reduction gearing or the like 16, and a fan and fan housing generally indicated at 18, for a purpose to be hereinafter described.

The frame 12 may be conveniently provided by means of a pair of side frame members which extend substantially the length of the machine and which are indicated at 20 and 22. These side frame members may be made of sheet metal punched and bent to required form and provide for the support for various cross shafts, to be described.

There is provided a first belt indicated at 24. This belt is driven in the direction of the arrow in FIG. 2 i.e., to the right in FIGS. 1 and 2. A hopper containing the articles generally indicated at 26 is provided in any way desired, supported by a framework 28 and having an inclined chute at 30, and a cooperating baffle 32 provides a constant supply of articles onto the belt 24. In order to align the articles and provide for a single layer thereof so that the operator may have a clear vision of all the articles, there is provided a rotary driven brush 34 driven in a clockwise direction by means of a belt or chain 36.

The belt 24 is one of the inspection or sorting belts and forms the initial run. As the articles are moved along by this belt, they are clearly visible and accessible to the operator. Belt 24 is provided with an end pulley at 38 and the articles travel on the belt around this pulley, being held thereto against gravity by means of an arcuate shoe 40. This shoe may be replaced for articles of varying thickness but during any particular run or operation of the machine, all the articles will be uniform.

The travel of the articles around pulley 38 in contact with shoe 40 inverts the articles and they then issue from the pulley in inverted relationship onto and are supported by a belt 42 which passes over a driven pulley or roller 44 and moves to the left in FIG. 1 as indicated by the appropriate arrows. The articles are disposed between belt 42 and the lower or return run of belt 24, as indicated by the reference numeral 46. This run of belt 24 progresses back to its starting point, passing around a small idler 48 and thence under the lower end of the inclined chute 30, the brush 34, etc.

Belt 42 is longer than belt 24 and extends around the idler 50, and it will be noted that belt 42 and the run 46 of belt 24 move slightly upwardly on an incline. Thereafter the lower run of belt 42, indicated at 52, passes around the driven pulley or roller 44 to once again engage with the lower run 46 of the belt 24. It is to be noted that the surface speed of these belts is the same.

Figure 2:
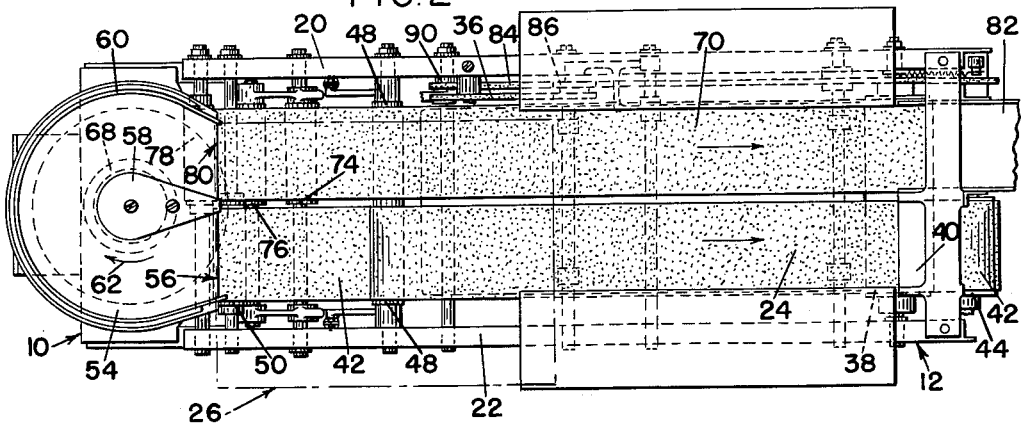
FIG. 2 is a top plan view thereof with the hopper removed but indicated in broken lines.
Figure 3:
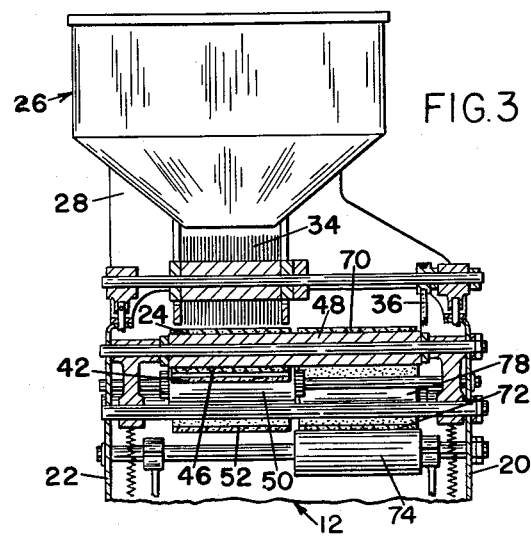
FIG. 3 is a section on line 3—3 of FIG. 1.
Figure 4:
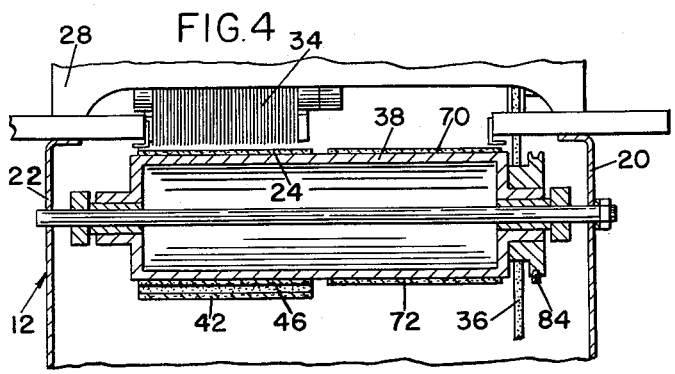
FIG. 4 is an enlarged section on line 4—4 of FIG. 1.

Belt 42 is provided at its issuing end adjacent idler 50 with a vibrator device in the form of a plate as generally indicated at 54. This vibrator plate has a relatively sharp entering edge or lip 56, and the articles are quickly and easily transferred from belt 42 onto vibrator plate 54. Reference is made to FIG. 2 where the shape of this plate is best shown and there is provided a raised tear-drop shaped guide member 58, which together with a raised lip or the like 60, provides an arcuate guide or horizontal chute for the articles which pass around in the direction of the arrow 62 in FIG. 2. The mechanism of the vibrator plate is old and well known and it comprises a series of leaf springs, one of which is shown at 64. These leaf springs are attached at the under side of plate 54 and to a fixed bottom or base member 66. The reference numeral 68 indicates a commercial vibrator, and it will be seen that as the same rapidly vibrates, the spring 64 will be twisted slightly and so will the plate, but the spring will then move the plate back to original position and this action causes such a vibration in the plate 54 as to cause the articles to move around as above described in the direction of arrow 62 between guide members 58 and 60.

The second inspection belt is indicated at 70 and it also has an upper run similar to belt 24 which moves in the same direction and preferably at the same speed and in the same plate. This belt also passes around pulley or roll 38 and is driven thereby but the arcuate inverting member 40 does not extend across the belt 70 and as shown in FIG. 2 is applied only to belt 24.

After passing around pulley or roller 38, belt 70 moves in the opposite direction as indicated at 72, and then passes over a pair of idlers 74 and 76 to the opposite end of the machine and over another idler 78. Idler 78 is located well below plate 54 and thus provides an upwardly inclined portion of the run of the belt 70 which then passes over idler 48 to come into co-planar position with relation to belt 24 traveling along beside the same, preferably at the same speed.

The plate 54 is provided with another lip at 80 and the articles are gradually vibrated past this lip onto the upwardly extending portion of the belt 70, and thus it will be seen that the inverted articles are passed along from one belt to the other and move in front of the operator who may stand at either side of the machine and inspect or sort the articles twice, first as they pass along belt 24, and then with the opposite sides visible as they pass along belt 70.

When belt 70 passes over the pulley or roller 38, the articles then merely fall by gravity onto a chute 82 and then into any container as may be desired for further processing, as for instance packaging.

The motor 14 drives the gear-reducer 16 and the gear-reducer drives a sprocket or belt which is indicated at 84. This belt passes first over an idler 86, then around pulley or roller 44, driving the same; thence under pulley or roller 38, driving the latter. Belt 84 then passes over the idler 88 which holds it against pulley 38 to drive the latter, and then moves over idler 90 back to the speed reducer. The pulley 86 is double and provides a driving means for the belt or sprocket 36 described above which is used to drive the brush 34.

The operator is ordinarily provided with a flexible hose which may be attached to a connection 92 on a catch-box 94. This box is provided with a vacuum derived through a pipe 96 from a fan in the housing 18. The operator may therefore pick out faulty articles from either belt 24 or 70 or may separate such articles as may be desired upon individual inspection thereof. The box 94 is preferably provided with a transparent hinge door 98 so that it will be apparent when the same is nearing completion. However, any kind of catch-box may be provided for this purpose.

It will be seen that this invention provides an apparatus which carries out all the objects of the invention as set forth above. A single operator is thereby enabled to inspect or sort all of the articles which are carried along by the two runs 24 and 70, and the operator is enabled to do this because of the arrangement of these belts with relation to each other and the combination therewith of the vibrator device. Both sides of the articles are clearly visible and the operator is provided with means for abstracting selected articles from either belt 24 or belt 70.

Having thus described my invention and the advantages thereof, I do not wish to be limited to the details herein disclosed, otherwise than as set forth in the claim, but what I claim is:

Apparatus of the class described comprising a frame, pulleys thereon, a first endless inspection belt on said pulleys, said endless belt having an exposed horizontal run, a hopper for articles adjacent an end of said run, means inverting the articles at the other end of the run, where the belt runs downwardly over one of said pulleys, said inverting means including a curved guide shoe in closely spaced operative relationship to the belt as it reverses direction about the respective pulley, an article transfer belt receiving the inverted articles and traveling the same in the opposite direction, a second endless inspection belt having an exposed run generally coplanar with the first inspection belt run, an article transfer device for the inverted articles to transfer the same from the transfer belt to the second inspection belt, said article transfer device comprising a generally U-shaped vibratory plate and means to rapidly vibrate the plate, said vibratory plate having an article receiving lip at the end of one leg closely adjacent the article transfer belt and another lip at the end of the other leg closely adjacent the second inspection belt so that the articles move smoothly onto the vibratory plate and around the same and onto the second inspection belt, discharge means for the articles on the second inspection belt adjacent the opposite end thereof from the article transfer device, and means to drive the inspection belts with the exposed runs thereof traveling in the same direction.

References Cited in the file of this patent

UNITED STATES PATENTS

| | | |
|---|---|---|
| 1,031,481 | Snyder | July 2, 1912 |
| 1,356,852 | Clark | Oct. 26, 1920 |
| 1,385,000 | Griffing | July 19, 1921 |
| 1,401,895 | Dusha et al. | Dec. 27, 1921 |
| 1,460,862 | Pierette | July 3, 1923 |
| 1,513,482 | Brown | Oct. 28, 1924 |
| 1,516,016 | Kallenbach | Nov. 18, 1924 |
| 2,006,091 | Walter | June 25, 1935 |
| 2,630,202 | Saxe | Mar. 3, 1953 |
| 2,732,057 | Temple | Jan. 24, 1956 |